(12) United States Patent
Schindler et al.

(10) Patent No.: US 10,250,044 B2
(45) Date of Patent: Apr. 2, 2019

(54) ENERGY STORAGE APPARATUS FOR A MOTOR VEHICLE AND METHOD FOR OPERATING THE ENERGY STORAGE APPARATUS

(71) Applicant: Bayerische Motoren Werke Aktiengesellschaft, Munich (DE)

(72) Inventors: Moritz Schindler, Munich (DE); Markus Mauerer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 60 days.

(21) Appl. No.: 15/468,533

(22) Filed: Mar. 24, 2017

(65) Prior Publication Data

US 2017/0197520 A1   Jul. 13, 2017

Related U.S. Application Data

(63) Continuation of application No. PCT/EP2015/070099, filed on Sep. 3, 2015.

(30) Foreign Application Priority Data

Sep. 25, 2014  (DE) .................. 10 2014 219 416

(51) Int. Cl.
*H02J 7/00* (2006.01)
*B60L 11/18* (2006.01)
*H02J 7/14* (2006.01)

(52) U.S. Cl.
CPC .......... *H02J 7/0021* (2013.01); *B60L 11/1853* (2013.01); *B60L 11/1855* (2013.01);
(Continued)

(58) Field of Classification Search
CPC .............. B60L 11/1855; B60L 11/1853; B60L 11/1857; B60L 11/1861; B60L 11/1868;
(Continued)

(56) References Cited

U.S. PATENT DOCUMENTS

2013/0252035 A1   9/2013 Lamp et al.

FOREIGN PATENT DOCUMENTS

DE   10 2006 048 872 A1   5/2008
DE   10 2010 062 116 A1   5/2012
EP        2 272 722 A2     1/2011

OTHER PUBLICATIONS

International Search Report (PCT/ISA/210) issued in PCT Application No. PCT/EP2015/070099 dated Nov. 23, 2015 with English-language translation (four (4) pages).
(Continued)

*Primary Examiner* — Carlos D Amaya
(74) *Attorney, Agent, or Firm* — Crowell & Moring LLP

(57) ABSTRACT

An energy storage apparatus for an onboard electrical system of a motor vehicle has a first electrical energy store characterized by a first voltage characteristic curve defining the quiescent voltage of the first store depending on the relative state of charge of the first store, and a second electrical energy store which can be connected in parallel with the first electrical energy store by a controllable switching element and which is characterized by a second voltage characteristic curve defining the quiescent voltage of the second electrical energy store depending on the relative state of charge of the second store. A first voltage value range covered by the first voltage characteristic curve and a second voltage value range which is covered by the second voltage characteristic curve partially overlap. The energy storage apparatus further has a device for determining the state of charge of the first energy store and/or of the second energy store. The device establishes the state of charge either by a quiescent voltage measurement device or by a state of charge determination device by balancing a respective battery current. The device opens the controllable switching element when the motor vehicle is in a state similar to the quiescent state and a quality value determined during a
(Continued)

previous state of charge determination process in parallel with the state of charge and expressing the quality of the balancing exceeds a predefined threshold value. When the two criteria are fulfilled, the quiescent voltage measurement device for determining the state of charge of at least the first energy store is activated.

17 Claims, 3 Drawing Sheets

(52) U.S. Cl.
CPC ....... *B60L 11/1857* (2013.01); *B60L 11/1861* (2013.01); *B60L 11/1868* (2013.01); *B60L 11/1872* (2013.01); *H02J 7/0047* (2013.01); *H02J 7/1423* (2013.01); *B60L 2240/545* (2013.01); *B60L 2240/547* (2013.01); *B60L 2240/549* (2013.01); *Y02T 10/7011* (2013.01); *Y02T 10/7044* (2013.01); *Y02T 10/7055* (2013.01); *Y02T 10/7066* (2013.01)

(58) Field of Classification Search
CPC ............ B60L 11/1872; B60L 2240/545; B60L 2240/547; B60L 2240/549; H02J 7/0021; H02J 7/0047; H02J 7/1423; Y02T 10/7011; Y02T 10/7044; Y02T 10/7055
USPC ........................................................ 307/10.1
See application file for complete search history.

(56) References Cited

OTHER PUBLICATIONS

German-language Written Opinion (PCT/ISA/237) issued in PCT Application No. PCT/EP2015/070099 dated Nov. 23, 2015 (six (6) pages).

ENERGY STORAGE APPARATUS FOR A MOTOR VEHICLE AND METHOD FOR OPERATING THE ENERGY STORAGE APPARATUS

CROSS REFERENCE TO RELATED APPLICATIONS

This application is a continuation of PCT International Application No. PCT/EP2015/070099, filed Sep. 3, 2015, which claims priority under 35 U.S.C. § 119 from German Patent Application No. 10 2014 219 416.4, filed Sep. 25, 2014, the entire disclosures of which are herein expressly incorporated by reference.

BACKGROUND AND SUMMARY OF THE INVENTION

The invention relates to an energy storage apparatus for an onboard power supply system of a motor vehicle. The energy storage apparatus includes a first electrical energy store, which is characterized by a first voltage characteristic that stipulates the quiescent voltage of the first electrical energy store on the basis of its relative state of charge, and a second electrical energy store, which is connectable in parallel with the first electrical energy store via a controllable switching element and is characterized by a second voltage characteristic that stipulates the quiescent voltage of the second electrical energy store on the basis of its relative state of charge. A first voltage value range, covered by the first voltage characteristic, and a second voltage value range, covered by the second voltage characteristic, partially overlap. Further, the energy storage apparatus includes a device for determining the state of charge of the first energy store and/or of the second energy store.

An onboard power supply system of a motor vehicle is used particularly for providing electric power for starting the motor vehicle and for operating electrical loads. In order to increase the certainty of the motor vehicle starting, onboard power supply systems having two rechargeable energy stores connected in parallel are known. A first energy store is usually a lead battery in the form of multiple lead-based storage elements, also referred to as cells. A second energy store, connected in parallel therewith, may be in the form of a powerful lithium ion battery, for example. In combination, functionalities such as automatic stopping and starting of the engine during vehicle operation and efficient braking energy recovery when the vehicle is coasting can be implemented. The provision of the second energy store allows the availability of load functions to be increased and the life of the first energy store to be extended. A vehicle onboard power supply system having two energy stores connected in parallel is also referred to as a dual energy store onboard power supply system.

Such a dual energy store onboard power supply system for a vehicle is known from DE 10 2010 062 116 A1, for example. In the case of this onboard power supply system, the two energy stores, whose voltage characteristics partially overlap, are connected in parallel in voltage-neutral fashion via a switch, a relay and/or hard wiring.

DE 10 2006 048 872 A1 proposes connecting a relay between a lead battery in the form of a starter battery and a power supply battery in the form of a lithium ion phosphate battery, the relay being actuable directly by an ignition lock of the motor vehicle. The starter battery is connected to the onboard power supply system of the motor vehicle exclusively when the ignition is switched on, the relay being closed in this case. The power supply battery is connected to the onboard power supply system of the motor vehicle both when the ignition is switched on and when the ignition is switched off, which means that electrical loads can be supplied with voltage or electric current by the power supply battery even when the ignition is switched off.

In dual energy store onboard power supply systems of this kind, attempts are made to connect the two energy stores in parallel for the longest possible proportions of time, this being ensured in most cases by the substantially longer idle time in proportion to travel time. As a result, the system voltage appearing in the onboard power supply system is a mixed potential. The mixed potential does not necessarily correspond to the single voltage of the energy stores, if these were electrically isolated from one another. This makes it difficult to determine the state of charge of the two energy stores, which, in the case of onboard power supply systems having only one energy store, is determined from a relationship between the quiescent voltage of the energy store and the state of charge.

It is an object of the present invention to provide an energy storage apparatus for a dual energy store onboard power supply system of a motor vehicle in which the state of charge can be determined in a simple and reliable manner. It is a further object of the invention to provide a method for operating such an energy storage apparatus that allows the state of charge of the energy stores to be determined in a simple and reliable manner.

These objects are achieved by an energy storage apparatus and a method for operating the energy storage apparatus in accordance with embodiments of the invention.

According to a first aspect, an energy storage apparatus for an onboard power supply system of a motor vehicle includes a first electrical energy store, a second energy store and a device for determining the state of charge of the first energy store and/or of the second energy store. The first electrical energy store is characterized by a first voltage characteristic that stipulates the quiescent voltage of the first electrical energy store on the basis of its relative state of charge. The second electrical energy store is connectable in parallel with the first electrical energy store via a controllable switching element. The switching element may be an internal switching element of the second energy store or an external switching element that is interconnected in series with the second energy store. The switching element may be provided, by way of example, for undertaking safety functions, in particular such as overvoltage protection, undervoltage protection or temperature protection, of the second energy store. The second electrical energy store is characterized by a second voltage characteristic that stipulates the quiescent voltage of the second electrical energy store on the basis of its relative state of charge. In this case, a first voltage value range, covered by the first voltage characteristic, and a second voltage value range, covered by the second voltage characteristic, partially overlap. The device for determining the state of charge of the first energy store and/or of the second energy store is designed to determine the state of charge either by way of a quiescent voltage measuring device for determining the state of charge on the basis of a quiescent voltage and/or by way of a state of charge determination device for determining the state of charge by balancing a respective battery current. The device for determining the state of charge is designed to open the controllable switching element when the motor vehicle is in a quiescent-state-like state and, at the same time, a quality value, which was determined during determination of the state of charge at an earlier time and in parallel with said state of charge and which expresses the quality of the balancing, exceeds a predefinable threshold value. The device for determining the state of charge is further designed to activate the quiescent voltage measuring device for determining the state of charge of at least the first energy store when these two criteria are met.

The energy storage apparatus allows determination of the state of charge by way of quiescent voltage measurement that is performable relatively accurately, such as that known from conventional battery systems. In this case, the state of charge is determined on the basis of the direct relationship between the state of charge and the quiescent voltage of the energy store to be measured. Such quiescent voltage measurement is performed, as in the case of known energy stores, as soon as a defined time in which there is no or almost no flow of current to the energy store or from the energy store has been identified. Between two quiescent voltage measurements, the state of charge is continued by balancing the battery current. Since the tolerance of the balanced state of charge becomes greater as the converted amount of charge increases, allowance is made for this circumstance by performing a quiescent state measurement only when the tolerance of the state of charge determined by balancing is too great (i.e. there is excessive uncertainty about the actual state of charge), after the vehicle for which there are quiescent-state-like conditions is switched off.

As a result, it is therefore possible to determine a sufficiently accurate state of charge of at least the first energy store, wherein there is the least possible restriction of the envisaged coupled operation. This is because the coupling between the two energy stores can be maintained whenever the quality value expressing the tolerance of the state of charge is good (i.e. the tolerance is low), which means that coupled operation of the two energy stores continues to be possible even when the vehicle is switched off. Furthermore, the energy storage apparatus can be implemented without additional hardware. It is possible to use known algorithms for a respective technology of the energy stores, which allows inexpensive implementation of the energy storage apparatus.

The device for determining the state of charge can, according to a further configuration, be designed to increment or decrement the quality value when the quality of the balancing by means of determination of the state of charge by the state of charge determination device decreases, and to decrement or increment the quality value in the opposite direction when the state of charge is determined by the quiescent voltage measuring device. The incrementation or alternatively decrementation of the quality value is effected as part of the determination of the state of charge by the state of charge determination device as the converted quantity of charge increases. The quality value allows for the circumstance that when the current is integrated with respect to time, certain errors can arise that become more and more noticeable as the length of time increases and result in a greater tolerance in the state of charge determined by computation. By contrast, determination of the state of charge by way of a quiescent voltage measurement using known algorithms is reliably performable, that the quality value can then be adapted as appropriate in the opposite direction.

The device for determining the state of charge may further be designed to open the controllable switching element with a time delay after the quiescent-state-like state is found, i.e. when or after the vehicle has changed to the quiescent-state-like state. In other words, this means that the switching element is not opened until after a defined parking time. This allows frequent operation of the switching element to be avoided during short-range operation of the vehicle.

The device for determining the state of charge may further be designed to repeat the determination of the state of charge by way of the quiescent voltage measuring device at prescribed intervals of time when or after the vehicle has changed to the quiescent-state-like state. This allows the quality the determination of the state of charge to be performed with greater accuracy as the parking time increases. As intervals of time, it is possible for measurements to be performed every hour, every half hour or the like, for example.

The device for determining the state of charge may further be designed to determine, i.e. to adapt, the quality value whenever the state of charge is determined by the quiescent voltage measurement. This ensures that—when considered over time—not every parking maneuver for which there is the quiescent-state-like state prompts the switching element to be opened and the state of charge to be determined by a high state measurement. Instead, the switching element can remain closed in many cases of a switched-off vehicle, which allows the first energy store to be charged by the second energy store, for example.

According to a further configuration, the device for determining the state of charge may be designed to close a controllable switching element when or as soon as the quiescent-state-like state of the motor vehicle is left. This ensures that both energy stores are already linked to the vehicle onboard power supply system for the starting procedure in order to allow for the high currents needed for the starting process.

The device for determining the state of charge may be a superordinate controller of the first and the second energy store. The superordinate controller may be connected to a respective appropriate control system, e.g. a battery sensor, of the first and the second energy store for the purpose of interchanging data. Alternatively, the device for determining the state of charge may be arranged in the first and second energy stores in a distributed manner. In this case, the first and second energy stores have, besides appropriate measuring and processing devices, means for direct communication. In this second variant, the superordinate controller can perform merely the rating.

According to one configuration, the first energy store is a lead acid storage battery. By contrast, the second energy store is a lithium ion storage battery. Such an energy storage apparatus, the operation thereof and advantages for the supply of power to a vehicle onboard power supply system are described by way of example in DE 10 2010 062 116 A1 from the applicant.

According to a second aspect of the present invention, a method for operating an energy storage apparatus for an onboard power supply system of a motor vehicle is provided. The energy storage apparatus includes a first electrical energy store, a second electrical energy store and a device for determining the state of charge of the first energy store and/or of the second energy store. The first electrical energy store is characterized by a first voltage characteristic that stipulates the quiescent voltage of the first electrical energy store on the basis of its relative state of charge. The second electrical energy store is connectable in parallel with the first electrical energy store via controllable switching element. It is characterized by a second voltage characteristic that stipulates the quiescent voltage of the second electrical energy store on the basis of its relative state of charge. In this case, a first voltage value range, covered by the first voltage characteristic, and a second voltage value range, covered by the second voltage characteristic, partially overlap. The device for determining the state of charge of the first energy store and/or of the second energy store is designed to determine the state of charge either by a quiescent voltage measuring device for determining the state of charge on the basis of a quiescent voltage or by a state of charge determination device for determining the state of charge by balancing a respective battery current.

The method involves the following steps being performed: determination of the state of charge of the first energy store and/or of the second energy store by the state of charge determination device via balancing of respective battery currents; parallel (i.e. simultaneous) determination of a quality value that expresses the quality of the balancing; opening of the controllable switching element when, as a first criterion, the motor vehicle is in a quiescent-state-like state and, as a second criterion, the quality value exceeds a predefined threshold value, and activation of a quiescent voltage measuring device for determining the state of charge of at least the first energy store in a quiescent-state-like state of the vehicle.

The method according to the invention has the same advantages as have been described above in connection with the energy storage apparatus according to the invention.

According to an expedient configuration of the method according to the invention, the quality value is incremented or decremented when the quality of the balancing by way of determination of the state of charge by the state of charge determination device decreases, and the quality value is decremented or incremented in the opposite direction when the state of charge is determined by the quiescent voltage measuring device.

According to a further configuration of the method, the controllable switching element is opened with a time delay after the quiescent-state-like state is found.

According to a further expedient configuration of the method, the determination of the state of charge by the voltage measuring device is repeated at prescribed intervals of time.

According to a further expedient configuration, the quality value is determined or adapted whenever the state of charge is determined by the quiescent voltage measuring device. In other words, the quality value is decremented or incremented in the aforementioned opposite direction.

According to a further expedient configuration of the method, the controllable switching element is closed when or as soon as the quiescent-state-like state of the motor vehicle is left.

The method according to the invention can be performed by a superordinate controller of the first and the second energy store, determination of the state of charge being performed by a respective unit, e.g. a battery sensor, of the first and second energy stores. In particular, the superordinate controller then delivers the signal to open or close the switching element, according to need.

In an alternative configuration, the method can also be performed by a unit, e.g. a battery sensor, of at least one of the energy stores. In particular, one of the two energy stores then delivers an appropriate signal to actuate the switching element to perform the above-described quiescent state measurement when the vehicle is switched off.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
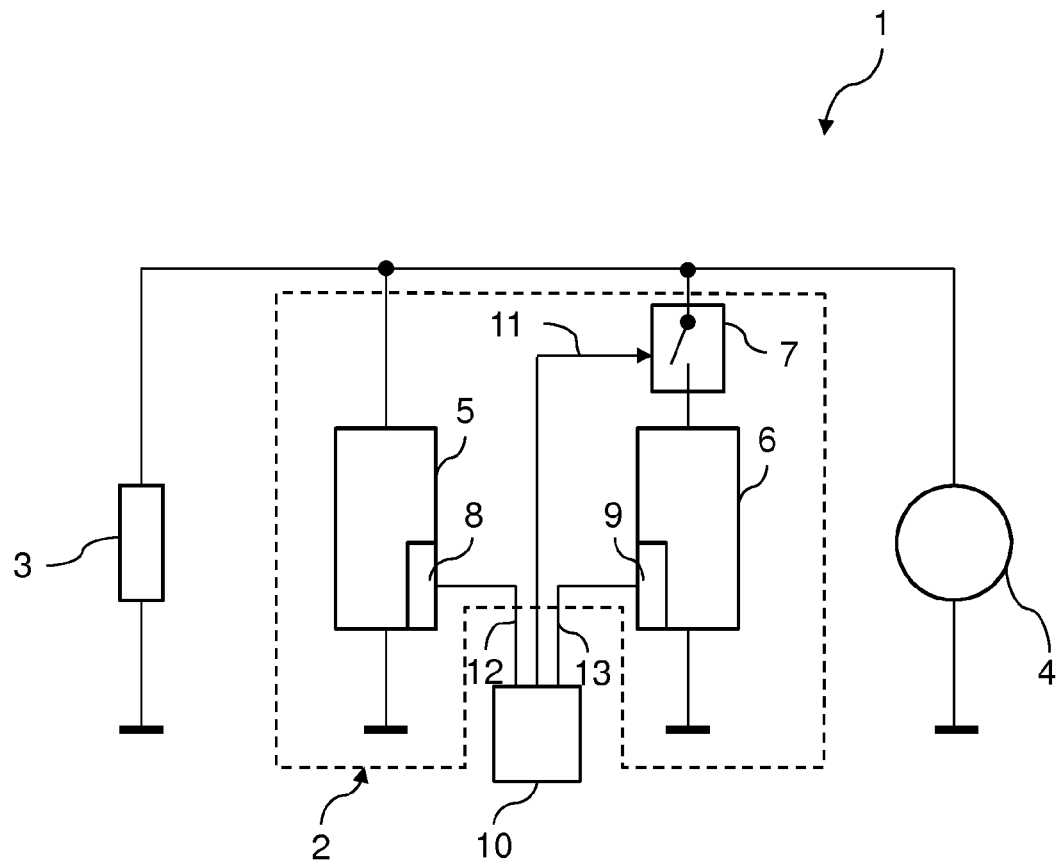
FIG. 1 is a schematic diagram of an energy storage apparatus according to an embodiment of the invention for a vehicle onboard power supply system.

FIG. 1 shows a schematic depiction of an onboard power supply system 1 of a motor vehicle according to an exemplary embodiment of the invention. The onboard power supply system 1 includes an energy storage arrangement 2, a starter and/or generator 4 and at least one load 3 that consumes electric power during operation, for example in the form of an air conditioning system or the like. The energy storage arrangement 2 includes two parallel-connected rechargeable energy stores 5, 6. The electrical connection of the energy stores 5, 6 is breakable by way of a controllable switching element 7. The controllable switching element 7 may be, as depicted schematically in FIG. 1, an external switching element. The switching element 7 may also be an internal switching element of the second energy store 6 that usually undertakes safety functions, such as particularly overvoltage protection, undervoltage protection and temperature protection. The system voltage of the onboard power supply system 1 is typically between 11 volts and 15.5 volts.

The onboard power supply system 1 further has an associated superordinate controller 10 that is particularly capable of using a control signal 11 to control the position of the controllable switching element 7. The controller 10 is further connected to a computation unit 8 that the first energy store 5 contains and to a computation unit 9 that the second energy store 6 contains via respective communication lines 12, 13. The computation units 8 and 9 are in particular respective devices for determining the state of charge (what are known as intelligent battery sensors) of the relevant energy store 5, 6. The computation units 8, 9 are designed to determine the state of charge of the respective energy store 5, 6 either by quiescent voltage measurement or by state of charge determination by balancing a respective battery current. The communication lines 12, 13 are used to transmit the respectively determined states of charge to the controller 10. The position of the controllable switching element 7 can also be stipulated, in an alternative configuration, by the computation unit 9.

The computation units 8, 9 can include both the measurement devices required for determining the state of charge and requisite computation devices in order to determine the state of charge. The computation units 8, 9 can also merely detect requisite measuring devices and include appropriate measurement signals to the superordinate controller 10 for determining the state of charge of the respective energy stores 5, 6.

Figure 2:
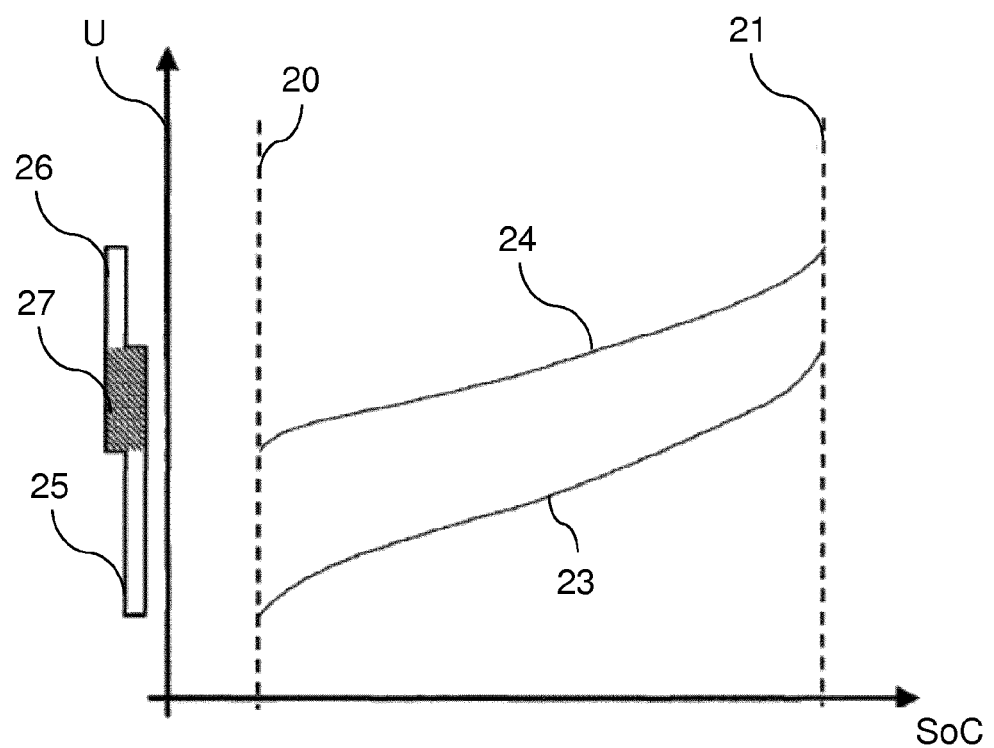
FIG. 2 is a graph of voltage characteristics for two electrical energy stores of the energy storage apparatus from FIG. 1.

FIG. 2 shows the profile of a voltage characteristic 23 of the first electrical energy store 5, which is embodied as a lead acid storage battery with a rated voltage of 12 volts, for example, plotted in the direction of the ordinate axis U as a function of the relative state of charge SoC thereof In this case, the range of the relative state of charge SoC between discharge 20 of the energy store 5 and full charge 21 of the energy store 5 is depicted. Further, the figure shows the profile of an analog voltage characteristic 24 of the second electrical energy store 6, which is embodied as a lithium ion storage battery with a rated voltage of 13.4 volts by way of example, plotted in the direction of the ordinate axis U. The two voltage characteristics 23, 24 show the quiescent voltage of the electrical energy stores 5, 6 in the state of an equilibrium. This means that the voltage between the battery poles without a load or external charging voltage, and after a period that is sufficiently long for a thermal and chemical equilibrium to be established, is depicted. This state appears after the vehicle has been parked for a sufficiently long time, for example, and is referred to as a quiescent-state-like state, in which only minimal currents flow in the onboard power supply system. The voltage range 25 covered by the first voltage characteristic 23 and the voltage range 26 covered by the second voltage characteristic 24 have an overlap 27. This means that not the entire voltage range 25 covered by the first voltage characteristic 23 is at higher voltage values than the voltage range 26 covered by the second voltage characteristic 24.

As is known to a person skilled in the art from DE 10 2010 062 116 A1, for example, the selection of two electrical energy stores on the basis of the voltage characteristics in an energy storage apparatus for a motor vehicle is additionally possible by virtue of selection on the basis of resistance characteristics. Since this or the types of the electrical energy stores for the present energy storage apparatus is of secondary interest, reference is made to the cited specification in this regard.

For selection and performance of an operating strategy and energy management for the vehicle, a simple variant involves merely the state of charge of the first energy store, that is to say of the lead acid storage battery, being detected, for example by a voltage measurement using a battery sensor of the computation unit 8. For reasons of precision, the voltage measurement is preferably effected as what is known as quiescent voltage measurement in the aforementioned quiescent-state-like state, that is to say while the vehicle is switched off (parked). In this case, the reliability of the quiescent voltage measurement increases as the length of time for which the vehicle is switched off increases. If the quiescent voltage is known, then the state of charge SoC can be ascertained from the relationship, shown in FIG. 2, between quiescent voltage and state of charge using known algorithms. Such determination is possible only when the switching element 7 is open.

During operation of the vehicle, in which the switching element 7 is closed, no quiescent voltage measurement can take place, since the system voltage appearing is a mixed potential on account of the different voltages of the first and second energy stores 5, 6. The parallel connection of the first and second energy stores 5, 6 is desirable for the longest possible proportions of time in order to keep the energy store 5 always in a highest possible state of charge on the basis of its lower cycle stability in comparison with the energy store 6. In particular, when the vehicle is idle, the energy store 5, that is to say the lead acid storage battery, is intended to be recharged by a second energy store 6, that is to say the lithium ion storage battery. This is possible on account of the partial overlap in the voltage characteristics of the two energy stores at the higher maximum voltage level of the second energy store 6 (see FIG. 2). This effect, referred to as internal charge reversal, occurs when the quiescent voltage corresponding to the relative state of charge of the energy store 5 is lower than that quiescent voltage that corresponds to the relative state of charge of the energy store 6. This means that the second energy store 6 needs to have a sufficiently high state of charge. The charge reversal current is dependent on the internal resistances of the energy stores 5 and 6 and the difference in the quiescent voltages. If the former or one of the former are very high and the latter are very low, then the charge reversal current is virtually zero.

This desirable operation of the energy storage apparatus is an obstacle to quiescent voltage measurement, which requires a quiescent-state-like state of the first energy store 5. The quiescent state determination can, as described, be performed only for the first energy store, but in a corresponding manner also for the second energy store.

The state of charge determination between two quiescent voltage measurements is therefore effected by balancing the battery current. This balancing can be effected by the computation unit 8 (and optionally 9) or alternatively by the superordinate controller 10. As the converted amount of charge increases, a quality value Q associated with the state of charge is incremented in order to indicate the rising tolerance of the state of charge. The quality value is ascertained for each energy store 5, 6 separately, i.e. determination of the state of charge is effected in a corresponding manner by the computation unit 9 for the second energy store 6 in addition. On the basis of the accuracy of the technique used for detecting the respectively required current for balancing, a maximum admissible charge transfer is stipulated that requires more accurate determination of the state of charge by a quiescent voltage measurement. When the charge transfer, which is reflected in the quality value, reaches the predefined threshold value, the controller 10 sets a signal (e.g. a flag), that, when the motor vehicle is in a quiescent-state-like state (that is to say is switched off), leads to the switching element 7 being opened by actuation with the control signal 11. After the switching element 7 has opened, quiescent-state-like states appear for both energy stores 5, 6, which means that the, or a, respective quiescent voltage measurement can take place.

The maximum possible charge transfer is implemented by the speed of the incrementation of the quality value Q. The quality value Q is related to the charge transfer. The quality value Q does not have to correspond to the charge transfer in terms of absolute value, however. The quality value can assume e.g. a value between 0 and 100, while the charge transfer can also assume values that are very much greater than 100.

Opening of the switching element 7 can be delayed by a variable, prescribed period of time since the vehicle was switched off. This opens the switching element 7 only after a defined parking time. Frequent switching in short-range operation can be avoided thereby. After the switching element 7 opens, the quiescent voltage of the energy stores 5, 6 is determined at prescribed instants. On the basis of the measured voltage and optionally further parameters, such as temperature, a quiescent current, and an aging state, the state of charge of the energy store is determined on the basis of stored families of characteristics and/or computation specifications.

Figure 3:
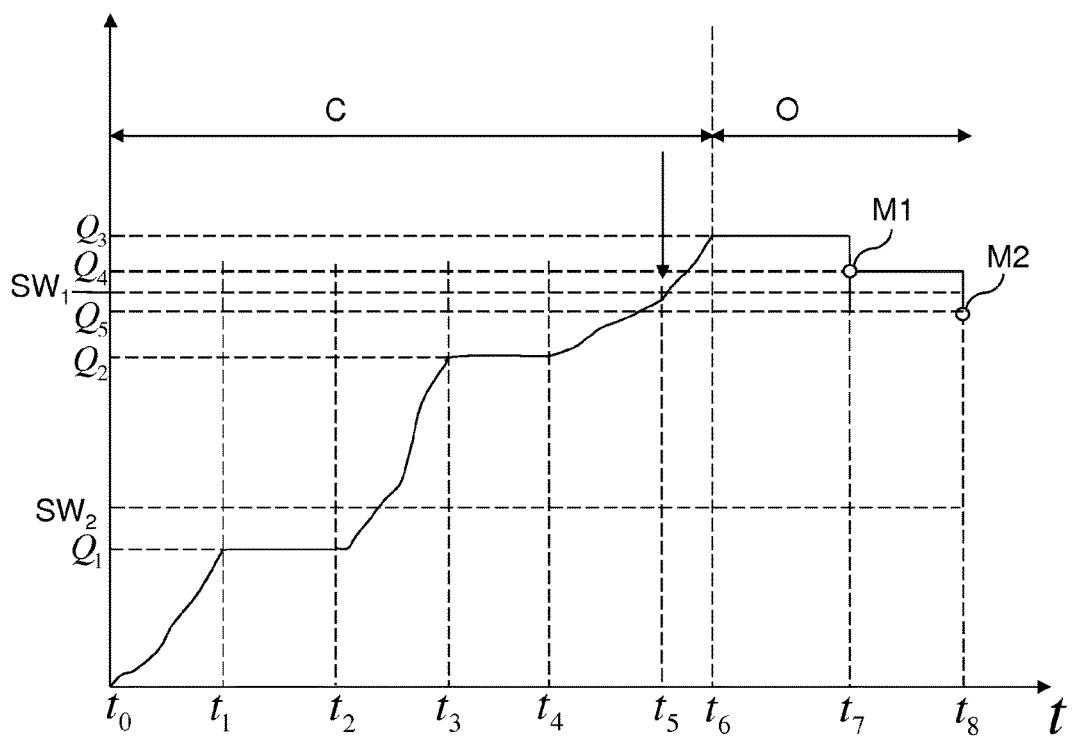
FIG. 3 is a graph of the profile of a quality value for a state of charge, determined by balancing, of a first energy store of the energy storage apparatus shown in FIG. 1.

Since the testimonial quality of the quiescent voltage measurement increases as the period of time since the switch opened increases, the quality value (which expresses the quality of the balancing and hence represents a confidence) is decremented, that is to say improved. The association between quality value and period of time elapsed can be made on the basis of battery temperature, quiescent current, aging state and ascertained state of charge, for example. When the vehicle and its onboard power supply system are reactivated, the switching element 7 is closed again. This can be accomplished by a command from the controller 10 or on the basis of the measured values captured by the computation units 8, 9. If the controller 10 or the computation units 8, 9 find(s) that the quality value and/or quality values Q of the respective states of charge of the energy stores 5, 6 have dropped below the (respectively) predefined threshold value again, then the signal (flag) that indicates opening of the switching element 7 is reset. In this case, separate threshold values may be provided for the activation and deactivation of the signal (flag). If the quality value is not sufficiently improved on the basis of the quiescent state measurements, that is to say if the quality value is still above the defined threshold value, then the signal (flag) is maintained, so that the method described above is applied again when the vehicle is next switched off The approach described is illustrated schematically in FIG. 3, which depicts the profile of the quality value Q over time. In this example, the quality value Q is defined such that as the values of Q become greater, the quality of the balancing decreases. In other words, the quality of the balancing is optimum when Q=0. In FIG. 3, it is assumed that the quality value is Q=0 at an instant t0. The vehicle starts e.g. after a long idle phase in which the state of charge was determined precisely by a quiescent voltage measurement. Up to an instant t1, the vehicle is traveling. Determination of the state of charge is effected for both energy stores in each case by balancing the battery current, since a quiescent voltage measurement is not possible on account of the closed switching element 7 (C). As a result, the quality value Q increases to a value Q=Q1. At the instant t1, the vehicle is switched off. Since Q1 is less than a predefined threshold value SW, the switching element 7 remains closed, that is to say that the switch position continues to be C. The parking time lasts until the instant t2. Up to this instant, the quality value Q does not change, or changes only slightly, on account of the little charge transfer, that is to say that Q=Q1 continues to be the case at the instant t=t2. A quiescent voltage measurement does not take place. Between t2 and t3, the vehicle travels further, i.e. the vehicle is reactivated at t=t2. The state of charge is again determined by balancing, so that the quality value Q is incremented to Q2. At the instant t=t3, the quality value reaches Q=Q2. The vehicle is switched off again at this instant. Since the quality value Q2 continues to be less than the predefined threshold value SW, the switching element 7 remains closed (switch position C). At the instant t=t4, the vehicle is reactivated and the state of charge of the energy stores is determined again by balancing. As a result, the charge value Q is incremented until it reaches the predefined threshold value at the instant t5. The first criterion is then met. The controller 10 sets a flag for opening the switching element 7. The switching element 7 remains closed. Up to the instant t=t6, the vehicle travels further, for which reason the quality value rises to Q3 on the basis of the further balancing performed for the battery current. Since the quality value Q3 is greater than the prescribed threshold value SW1, the flag is set and the vehicle changes to a quiescent-state-like state (parking) at the instant t6, the switching element 7 is opened (switch position O) at the instant t=t6. After a time delay, a first quiescent voltage measurement M1 is performed at the instant t=t7 and determines the state of charge on the basis of the quiescent voltage in the quiescent-state-like state of the vehicle. The quality value is decremented to a quality value Q4 on the basis of the relatively precise state of charge determination. Since there continues to be no reactivation of the vehicle, a further quiescent voltage measurement M2 is effected at the instant t8. As a result of this, the quality value is decremented further to the quality value Q5. Since the quality value is now below the predefined threshold value SW, the flag for opening the switching element 7 is reset by the controller 10. When the vehicle is next reactivated (not depicted), the switching element 7—regardless of whether or not the flag is set—is closed, and then, if the quality value reascertained until the vehicle is switched off remains below the threshold value, the switching element 7 continues to remain closed, as a result of which it is possible for an exchange of charge to take place between the energy stores.

The threshold value SW1 can be used for activating and deactivating the signal (flag) in one configuration. In an alternative configuration, the activation can be assigned a first threshold value (e.g. SW1) and the deactivation can be assigned a second threshold value (e.g. SW2, as shown in FIG. 3). In this case, deactivation of the flag is performed only in the event of a drop below SW2 (not depicted in FIG. 3). This allows toggling of the switching position of the switching element 7 to be avoided when there is a narrow drop below the threshold value SW1.

This approach allows a sufficiently accurate state of charge of the energy stores 5, 6 to be determined. In this case, the approach is connected to as small as possible a restriction of the envisaged coupled operation. There is additionally no need for additional hardware, and known algorithms can be used for the respective energy storage technology. This allows inexpensive implementation of the energy storage apparatus.

LIST OF REFERENCE SYMBOLS

1 Onboard power supply system
2 Energy storage apparatus
3 Load
4 Starter/generator
5 First energy store (lead acid storage battery)
6 Second energy store (lithium ion storage battery)
7 Switching element
8 Computation unit of the first energy store
9 Computation unit of the second energy store
10 Superordinate controller
11 Control signal for switching element
12 Communication line
13 Communication line
20 (Complete) discharge
21 Full charge
23 First voltage characteristic
24 Second voltage characteristic
25 First covered voltage range
26 Second covered voltage range
27 Overlap
Q Quality values
t Time
C First switch position of the switching element 7 (closed or conductive)
O Second switch position of the switching element 7 (open or nonconductive)
M1 Measurement
M2 Measurement
SW Threshold value
U Voltage
SoC State of charge The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage apparatus for an onboard power supply system of a motor vehicle, comprising:
a first electrical energy store, which is characterized by a first voltage characteristic that defines a quiescent voltage of the first electrical energy store on the basis of its relative state of charge;
a second electrical energy store, which is connectable in parallel with the first electrical energy store via a controllable switching element and is characterized by a second voltage characteristic that defines a quiescent voltage of the second electrical energy store on the basis of its relative state of charge,
wherein a first voltage value range covered by the first voltage characteristic, and a second voltage value range covered by the second voltage characteristic, partially overlap;
a device for determining the state of charge of the first energy store and/or of the second energy store, the device being configured to:
determine the state of charge either by a quiescent voltage measuring device for determining the state of charge on the basis of a quiescent voltage or by a state of charge determination device for determining the state of charge by balancing a respective battery current,
open the controllable switching element when: (i) the motor vehicle is in a quiescent-state-like state, and (ii) a quality value expressing a quality of the balancing, which quality value was determined during a previous determination of the state of charge and in parallel with said state of charge, exceeds a predefined threshold value, and
activate the quiescent voltage measuring device for determining the state of charge of at least the first energy store.

2. The energy storage apparatus as claimed in claim 1, wherein the device for determining the state of charge is further configured to:
increment or decrement the quality value when the quality of the balancing by determining the state of charge by the state of charge determination device decreases, and
decrement or increment the quality value in an opposite direction when the state of charge has been determined by the quiescent voltage measuring device.

3. The energy storage apparatus as claimed in claim 1, wherein the device for determining the state of charge is further configured to:
open the controllable switching element with a time delay after the quiescent-state-like state is found when/after the vehicle has changed to a quiescent-state-like state.

4. The energy storage apparatus as claimed in claim 3, wherein the device for determining the state of charge is further configured to:
repeat the determination of the state of charge by the quiescent voltage measuring device at prescribed intervals of time when the vehicle has changed to the quiescent-state-like state.

5. The energy storage apparatus as claimed in claim 1, wherein the device for determining the state of charge is further configured to:
determine the quality value whenever the state of charge is determined by the quiescent voltage measuring device.

6. The energy storage apparatus as claimed in claim 1, wherein the device for determining the state of charge is further configured to:
close the controllable switching element when/as soon as the quiescent-state-like state of the motor vehicle is no longer present.

7. The energy storage apparatus as claimed in claim 1, wherein
the device for determining the state of charge is a superordinate controller of the first and the second energy store.

8. The energy storage apparatus as claimed in claim 1, wherein
the device for determining the state of charge is arranged in the first and second energy stores in a distributed manner and the first and second energy stores directly communicate.

9. The energy storage apparatus as claimed in claim 1, wherein the first energy store is a lead acid storage battery.

10. The energy storage apparatus as claimed in claim 9, wherein the second energy store is a lithium ion storage battery.

11. The energy storage apparatus as claimed in claim 1, wherein the second energy store is a lithium ion storage battery.

12. A method for operating an energy storage apparatus for an onboard power supply system of a motor vehicle, the method comprising the acts of:
providing a first electrical energy store, which is characterized by a first voltage characteristic that defines a quiescent voltage of the first electrical energy store on the basis of its relative state of charge;
providing a second electrical energy store, which is connectable in parallel with the first electrical energy store via a controllable switching element and is characterized by a second voltage characteristic that defines a quiescent voltage of the second electrical energy store on the basis of its relative state of charge,
wherein a first voltage value range covered by the first voltage characteristic, and a second voltage value range covered by the second voltage characteristic, partially overlap;
providing a device for determining the state of charge of the first energy store and/or of the second energy store, which is configured to determine the state of charge either by a quiescent voltage measuring device for determining the state of charge on the basis of a quiescent voltage or by a state of charge determination device for determining the state of charge by balancing a respective battery current;
determining the state of charge of the first energy store and/or of the second energy store by the state of charge determination device by balancing respective battery currents;
determining in parallel a quality value that expresses the quality of the balancing;
opening the controllable switching element when, as a first criterion, the motor vehicle is in a quiescent-state-like state and, as a second criterion, the quality value exceeds a predefined threshold value; and
activating the quiescent voltage measuring device for determining the state of charge of at least the first energy store in a quiescent-state-like state of the vehicle.

13. The method as claimed in claim 12, wherein
the quality value is incremented or decremented when the quality of the balancing by determining of the state of charge by the state of charge determination device decreases, and
the quality value is decremented or incremented in an opposite direction when the state of charge is determined by the quiescent voltage measuring device.

14. The method as claimed in claim 12, wherein the controllable switching element is opened with a time delay after the quiescent-state-like state is found.

15. The method as claimed in claim 12, wherein the determination of the state of charge by the quiescent voltage measuring device is repeated at prescribed intervals of time.

16. The method as claimed in claim 12, wherein the quality value is determined whenever the state of charge is determined by the quiescent voltage measuring device.

17. The method as claimed in claim 12, wherein the controllable switching element is closed when/as soon as the quiescent-state-like state of the motor vehicle is no longer present.

\* \* \* \* \*